Sept. 17, 1935.  C. M. FINLEY  2,015,027
ROTARY ENGINE
Filed July 26, 1933  3 Sheets-Sheet 1

Inventor
Charles M. Finley
By Lynn H. Latta
Attorney

Sept. 17, 1935.  C. M. FINLEY  2,015,027

ROTARY ENGINE

Filed July 26, 1933  3 Sheets-Sheet 2

Inventor
Charles M. Finley
By Lynn H. Latta
Attorney

Sept. 17, 1935.                C. M. FINLEY                2,015,027
                               ROTARY ENGINE
                          Filed July 26, 1933      3 Sheets-Sheet 3

Inventor
Charles M. Finley
By Lynn H. Latta
Attorney

Patented Sept. 17, 1935

2,015,027

UNITED STATES PATENT OFFICE 2,015,027

ROTARY ENGINE

Charles M. Finley, Sioux City, Iowa, assignor of one-half to Roy T. Quick, Jr., Sioux City, Iowa Application July 26, 1933, Serial No. 682,256

1 Claim. (Cl. 123—14)

My invention relates to a rotary engine of the combustion type.

An object of my invention is to provide a rotary engine which will develop power through a pure rotary motion utilizing combustion principles and eliminating the necessity of reciprocating parts.

A further object of my invention is to provide a rotary engine of this type which includes combustion means unassociated with electrical ignition parts and the like.

A further object of my invention is to provide an efficient oiling means for the engine.

A further object of my invention is to provide an engine of this type which will cause the explosive forces to be directed partially tangential to the rotor itself, and in a direction radially thereto.

A further object of my invention is to provide means for maximum efficiency in the combustion chambers, such means including a high compression ratio, a minimum loss due to effective scavenging of burned exhaust gases, and effective shape of the combustion chambers.

A further object of my invention is to provide a motor which is comparatively light for the horse power developed and which provides efficient reenforcing means consistent with lightness, and provides valve arrangements working integrally with the main rotating and reciprocating parts.

A further object of my invention is to eliminate a great many working parts now necessary in reciprocating engines, and to simplify the construction of the rotary engine to the greatest possible extent.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1:
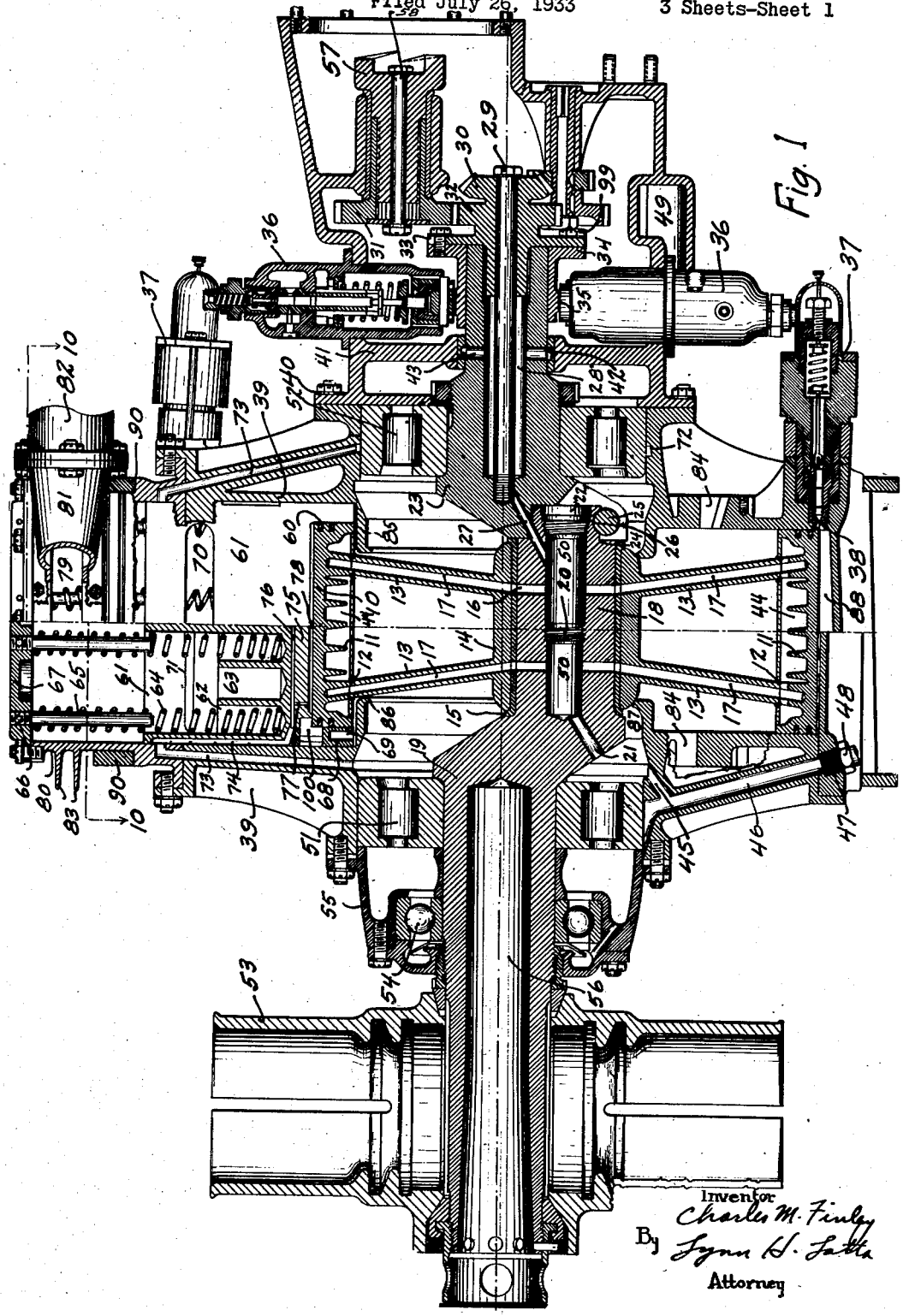
Figure 1 is a sectional view taken medially along the shaft of the engine and showing broken away sections of the slide housing and the turbulence chamber.

The disadvantages of the present reciprocating engine are varied and many. The modern gasoline engine, although developed to a high degree, has a very low mechanical efficiency in comparison to the engine of the rotary type. The reason for this is due largely to the fact that the reciprocating type of engine, by virtue of the starting and stopping effects, undergoes severe strains under its operation. Furthermore, a great many more parts are in sliding contact with cylinder walls and the like, causing a large amount of friction to be prevalent in the machine.

It will be realized, that if combustion principles can be applied successfully to a rotary type engine, that the efficiency will be greatly increased, due to the elimination of the aforementioned factors.

To successfully devise such an engine, it is, therefore, necessary to apply the explosive forces on a rotating body in the correct manner and in such proportion that the forces will be most efficiently directed thereagainst.

The principal features of my invention comprise the rotation of a true circular rotor adapted to rotate eccentrically within a circular stationary frame, and to successively form combustion chambers spaced equally thereabout, and to harness the expanding forces of the rapidly burning gases.

I have used the character 10 to designate generally the rotor itself, which is cylindrical in shape and includes the fins 11 for the cooling thereof. The outer portions of the rotor are welded or suitably affixed at 12 to the hollow spokes 13 which are affixed to the hub 14. The hub 14 is journalled on the bearing 15, which bearing includes a series of radially drilled holes 16 located therein.

It will be noted that the hub and bearings provide a continuation of the openings in the hollow spokes 13, which are indicated by the character 17.

The bearing 15 is mounted eccentrically on the portion 18 of the shaft 19. The portion 18 includes the opening 50 which is plugged approximately in the center thereof, by means of the plug 20. The ends of the opening 50 terminate in the further openings 21 and 22. The shaft 19 is formed integrally with the portion 18 as shown, however, the other extremity of the shaft 23 is made of a separate piece so that the rotor 19 can be mounted on to the crank arm 18 during the assembly thereof.

The shaft 23 is adapted to clamp about the portion 24 by virtue of the bolt 25 which passes through the indent 26. This bolt is clamped under a great deal of pressure to insure a maximum rigidity to the structure. The shaft 23 includes the opening 27 arranged to communicate with the opening 50 and the shaft 23 also has the opening 28 bored longitudinally thereof. Passing through the opening 28 is the bolt 29 which bolts through the gear 30, a portion of which gear is driven from the starting gear 31 by virtue of its engagement with the further gear 32. The gear 32 includes the integral member 33 which is clamped to the cam 34. The bolts 99, which bolt these pieces together, are passed through a plurality of openings arranged about the periphery thereof, which openings are so arranged that the timing of the cam can be controlled by merely shifting the engagement of the openings.

The cam 34 includes the extended cam portions 35, which are adapted to operate the standard injection pumps 36, which pumps operate the standard injection nozzles 37. The injection pumps and nozzles need not be elaborated on herein since they are well known in the art, and the nozzle is adapted to inject a highly atomized spray at 38 into the chambers of the engine. The cam portion 35, of course, regulates the period or motion of injection, so that the atomized fuel is injected in proper sequence, and this cam operates the springs, push rods, and the like within the injection pump 36 in a satisfactory manner to cause this operation.

The stationary frame of the engine is indicated generally by the character 39. Bolted against the frame is the member 40, which carries the flange 41, which flange in turn includes the hollow ring portion 42, which communicates with a series of radially drilled holes 43, which holes are drilled through the shaft, and communicate with the opening 28.

Oil is pumped into the ring 42 by a suitable oil pump, and the same then passes into the opening 28 through the opening 43. The opening 27 is drilled through the shaft 23 at one side of the bolt 29, thereby allowing unrestricted passage of the oil to the opening 50. The oil then travels through the opening 50 and is effectively stopped by the plug 20. It then flows outwardly through the right hand spokes as shown in Figure 1, through the hollow spaces 44, thence inwardly through the left hand spokes, through the left hand opening 50; thence out through the opening 21, where it passes through the openings 45 and 46 and downwardly through the opening 47, through the connection 48, where it is then carried through a suitable cooling arrangement and the like, and passes into the sump 49 where the cycle is again repeated.

It will be seen from these features that the passage of the cooled oil through the rotor in this manner will cool the same due to the thinner sections of the spokes and the fins.

The frame 39 carries the roller bearings 51 and 52, which receive the shafts 19 and 23.

Since the engine is intended to be used principally for aeronautical uses, the conventional propeller hub 53 is shown mounted on the shaft with a thrust bearing 54 mounted within the casing 55, which casing is attached to the frame 39. The bolts, nuts, and the like necessary for clamping the various members to one another need not be described here, since these processes are well known to anyone skilled in the art.

The hollow bored section 56 is provided in the shaft 19 to insure lightness therein.

The starter ratchet is indicated generally by the character 57, and is attached to the gear 31 by means of the bolt 58. The starter can be started with an auxiliary motor, by hand, or in any other familiar fashion.

It will be understood that a suitable connection is made between the injection pump 36 and the injection nozzle 37 which connection is not shown herein.

The rotor carries the circular rings 59 which are utilized to prevent escape of oil and burning gases, and act in this respect similar to the ordinary piston rings in a reciprocating engine. Suitable expansion rings are placed beneath these rings to force the same outwardly at all times.

It will be noted that the outer cylindrical surface of the rotor does not touch the stationary frame at any time. This is not necessary since the pressure of the gases and the like is contained between the slides.

Now that the principal mechanical features of the rotor have been explained, we shall pass to the slides, which are spaced equally about the rotor, and which provide the chambers for effectively storing and directing the energy of the burning gases. The slides are indicated generally by the character 61. These slides are generally hollow in section, and include the depressions 62 and 63. The depressions 62 are arranged to receive the compression springs 64, which receive the guide rods 65, which rods are threadedly engaged at 66 to the keep-plate 67. The cavities 63 provide the function of attaining lightness to the valve.

The valve 61 includes the downwardly projecting ends 68 which are adapted to straddle the rotor with a tight fit therebetween. The openings 69 are formed within these portions to achieve further lightness. The valve 61 includes the longitudinal slot 70 on one side, and the slot 71 on the other side thereof, the purpose of which will be explained later.

The slides are oiled in the following manner:

Oil is pumped into the hollow ring 72 from which it passes through the opening 73 in the stationary frame 39. The oil then passes downwardly through the grooves 74 in the slide itself. The rotor engaging member 75, which is approximately semi-cylindrical, is received within the slide between the ends 68. This member is adapted to closely fit the curvature of the rotor and is slidably received within the slide 61, so that during the operation of these slides, this member can rock freely during the changing positions of the arrangement.

The member is pivotally held in place by means of the pin 100 passing through the sides 68.

The member 75 includes the grooves 76, 77, and 78, which communicate with the groove 74, allowing the oil to pass therethrough, causing an efficient lubrication on all wearing surfaces. Since the groove 74 is adjacent the wall of the stationary frame, as shown, the side will therefore be satisfactorily lubricated. Similarly, a plurality of oil grooves are provided within the casing about the lengthened sides of the slides to provide lubrication on these surfaces also.

The inlet opening 79 is provided at the upper end of the slide receiving chamber 80, which inlet is attached to the head 81 to which is attached the further tube 82. The member 82 is attached to a suitable blower which is adapted to supply air under pressure through the hollow slides. The slide housing 80 includes the cooling fins 83.

It will be observed that as the rotor rotates, it is constantly in close engagement with the slide valve, with the downward portions 69 of the slides engaging the sides thereof, and the semi-cylindrical member bearing against the rotor. The pressure in the spring 64 is sufficient to maintain a close engagement with the rotor during any rotational speed of the same.

The exhaust ports 84 are provided in the frame and are spaced suitable, as will be explained later, to allow the proper exhaust effect and scavenging of the burned gases.

Inwardly projecting ring flanges 85 having the downwardly projecting lips 86 are integrally formed with the frame to cause catching of excess oil within the portion 87 to allow the same to run downwardly to the opening 45 and thence back to the sump.

Adjacent the slide housings, the frame includes the pockets or cavities 88, which are adapted to increase the turbulence of the mixed air and gases.

The fuel is injected at the point as shown in the diagrammatic figures just between the pocket 88 and the rotor. The point of injection is extremely small and causes an extremely fine atomization.

Spaced equally about the stationary frame are the fins 89. In order to strengthen the machine, and at the same time provide suitable lightness for the purpose intended, I provide the rings 90, which are shrunk about these fins. This insures sufficient strength to the machine and the majority of the strains will be absorbed by these rings, which are relatively light.

The further fins 91 will taper downwardly, since the cavity 88 will also taper, or, if necessary, the rings can pass through suitable openings in the fins 91.

Figure 2:
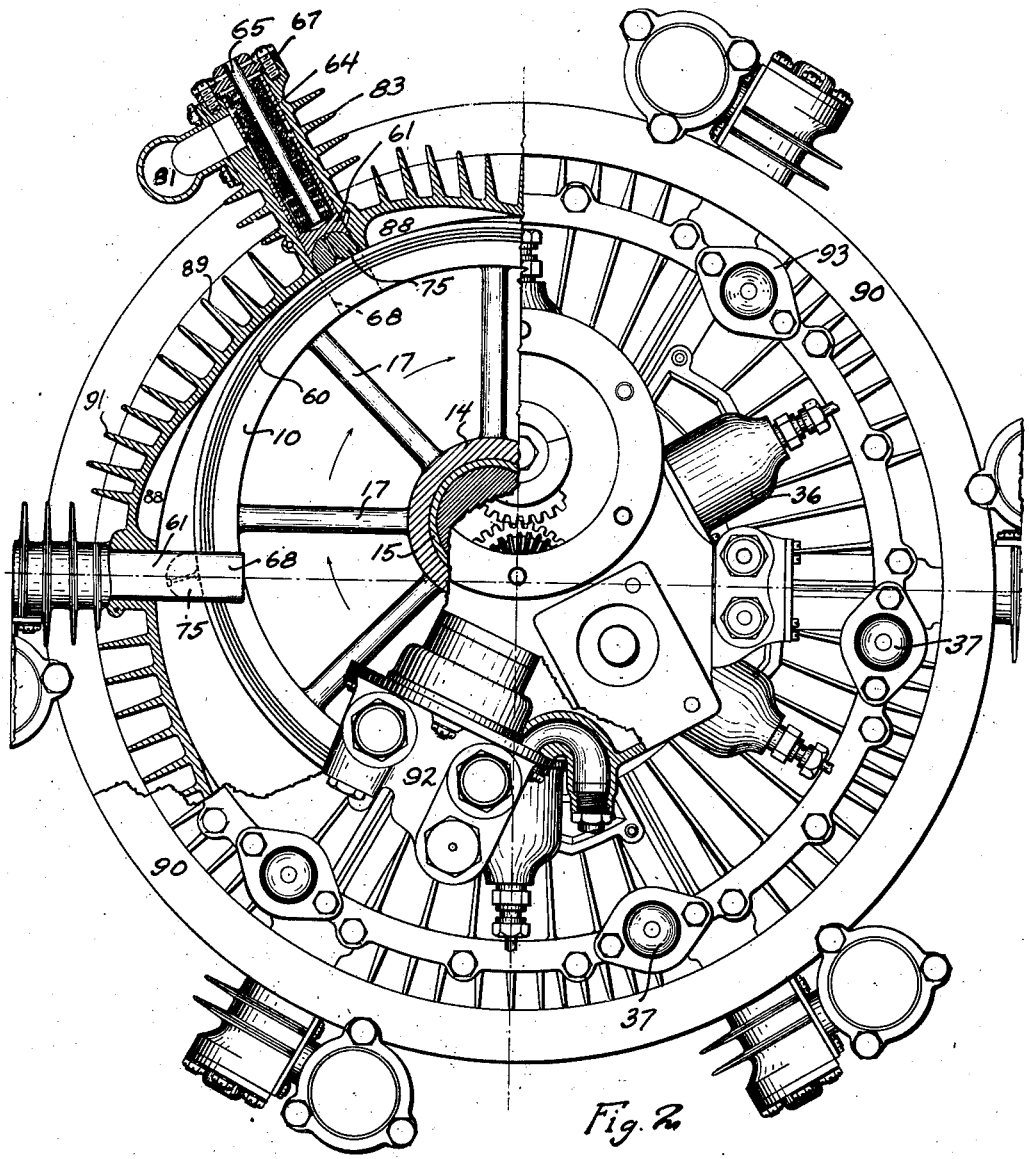
Figure 2 is a partially sectional view taken of an elevation of the engine being taken from the rear thereof, and showing fragmentary sections of the slide housing, and partially external view of the rotor.

In Figure 2, the conventional oil pump is indicated by the character 92 and need not be elaborated on herein, and the flanges for receiving the injection nozzles are indicated by the character 93.

Now that the principal features of the engine have been explained, I shall now explain the working operation thereof.

Figure 3:
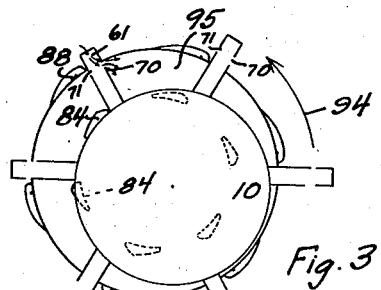
Figure 3 is a sketch showing the working relation of the engine with respect to the various slides and the rotor showing the rotor started on the up stroke.

These functions are shown in Figures 3 to 8 inclusive. In Figure 3, the rotor, which is rotating in the counter clock-wise direction, as indicated by the arrow 94, is starting on its up stroke. Referring to the upper central chamber 95, it will be seen that the exhaust port 84 in this chamber is closed, since the rotor sides are pressing thereagainst.

The slide 61, which is within the hollow circular frame and the larger opening 78, is now open allowing air under pressure to be blown into the chamber. It will be noted that the slide to the right has the openings 71 and 70 closed.

Figure 4:
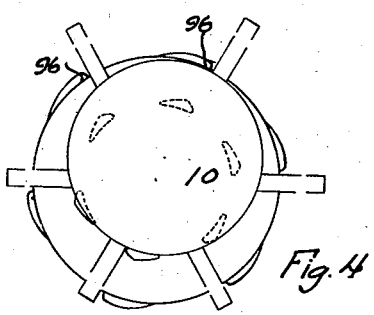
Figure 4 shows the rotor in position just before top center.
Figure 5:
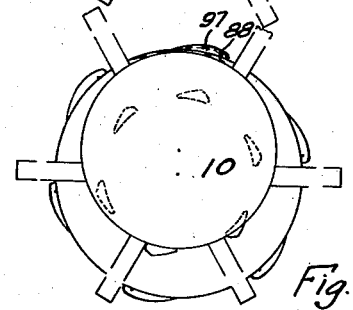
Figure 5 shows the rotor advanced still further and shows the sweeping action of the turbulent air.

The next position of the rotor is shown in Figure 4, with both slides forced upwardly nearly to the maximum. The air in the chamber is then compressed and at approximately this time, fuel is injected at the point 96, as the air is compressed due to the rapidly increasing compression, the air reaches an extremely high temperature which will be approximately 1000 degrees fahrenheit. At this point, as heretofore explained, the fuel is injected in a highly atomized condition and Figure 5 illustrates by means of the arrows 97, the sweeping action of the turbulent air within the pockets 88. It will be seen from the construction of the pocket that the air is literally squeezed into the pocket, providing a thorough mixing effect with the injected fuel.

Figure 6:
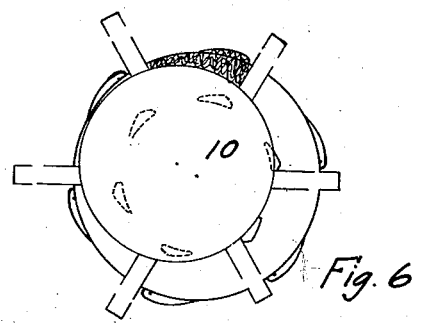
Figure 6 shows the machine during the expansion stroke.

It will be noted in Figure 1 that the injection nozzles are positioned in a slightly divergent relation with respect to the engine. This allows the sprayed fuel to be injected slightly outwardly and across the entire chamber combining with the turbulent air to provide a maximum of efficient combustion. As soon as the highly atomized fuel strikes the highly compressed air, which now is heated to a very high temperature, the explosion or rapid combustion takes place, and the rotor is then traveling to the approximate position as shown in Figure 6.

Figure 7:
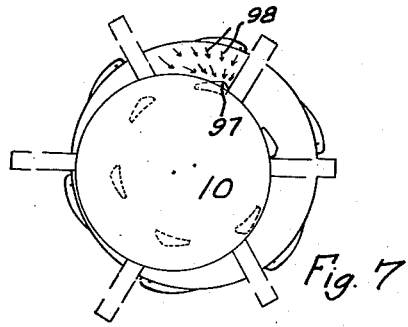
Figure 7 shows the exhaust port opening.

Figure 7 shows the exhaust port 84 showing the small portion of this port 97 being uncovered with the burned gases as indicated by the arrows 98 being blown therefrom.

Figure 8:
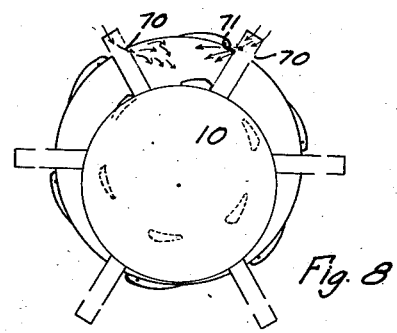
Figure 8 shows the air port opening and the scavenging operation. These operations refer specifically to the upper central chamber.
Figure 9:
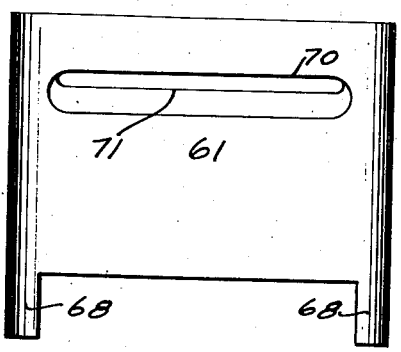
Figure 9 is an elevation of the slide.
Figure 10:
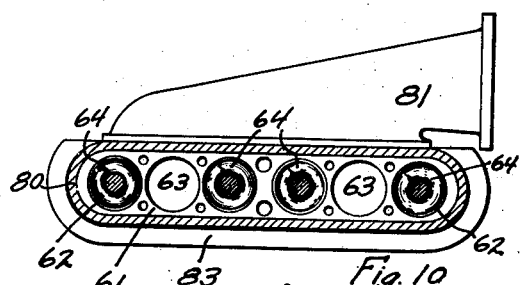
Figure 10 is a sectional view taken through the slide and the slide housing, and being taken generally along the lines 10—10 of Figure 1.

Figure 8, shows the next position of the rotor with the exhaust fully opened, and air ports 70 and 71 in the slides also opened causing an efficient scavenging of the burned gases by blowing any residue through the exhaust port. The opening 71 in this instance assists in the scavenging of successive chambers.

It will be understood, of course, that the identical effects and functions will be performed successively within the spaces between the slides, so that the rotor will receive six impulses during one rotation, since the rotor is mounted eccentrically on its shaft; the impulses will be directed against the rotor surface in such a manner that the leverage due to the crank arm having the forces exerted against the rotor will develop power and torque in the shafts 19 and 23.

The impulses are imparted to the rotor surface in a smooth flow of power, which causes a uniform rotary motion to the rotor without the jerks and stops prevalent in the reciprocating type.

It will be noted that the rotor rotates freely on the bearing 15. This feature is quite important since, if the rotor were fixed at this point, the outer peripheral speed of the rotor against the slides would result in an excess of friction losses. Since the rotor is journalled in this manner during the eccentric rotation of the same, the tendency for the rotor is to rotate in an opposite direction to its eccentric movement due to the retention of frictional forces exerted by the slides, etc. In this way the speed of rotation of the outer surface of the rotor is reduced to a minimum, and likewise the heat of combustion formed in successive chambers is distributed equally about the surface thereof. This produces the desirable result of eliminating a great deal of heating and losses due to friction, and more equally distributes the heat generated in the rotor.

It will now be seen that I have provided a rotary engine, which will develop power through pure rotary motion and eliminates the necessity of reciprocating parts.

It will also be seen that I have provided these means in an engine which eliminates the necessity of ignition parts and the like, which is suitably cooled and oiled, and is adapted to stand considerable strain, being rugged in construction, yet light.

It will be seen further that I have provided a rotary engine which provides an efficient two-cycle operation with a minimum loss of power due to effective scavenging of burned exhaust gases, and that I have provided an engine of relatively few parts for the purpose intended, which eliminates the several and varied pieces necessary in the reciprocatory engine.

It will be understood that the engine can be used involving similar principles and adapted for four-cycle Otto or Diesel operation with suitable means for ignition, fuel carburetion or injection and valvular action.

Some changes may be made in the construction and arrangement of the parts of my invention without departing from the real spirit and purpose of my invention, and it is my intention to cover by my claim any modified forms of structure or use of mechanical equivalents, which may be reasonably included within its scope.

I claim as my invention:

A rotary engine comprising a circular hollow frame, a circular rotor journalled eccentrically within the frame, said rotor being adapted to rotate freely about its journalled axis, and said rotor being arranged to rotate within said frame freely spaced from the inner periphery thereof throughout said rotation, a plurality of hollow slides spaced about the frame adapted to bear against the rotor to form successive chambers about the rotor, means for introducing air through the hollow slides, and means for introducing an atomized fuel into the said chambers.

CHARLES M. FINLEY.